(12) United States Patent
Kelly (10) Patent No.: US 11,128,207 B2
(45) Date of Patent: Sep. 21, 2021

(54) AXIAL FLUX GENERATORS HAVING A FLAT STRIP CONDUCTOR WITH PARTICULAR AXIAL WIDTHS FOR LONG TERM RELIABILITY

(71) Applicant: GREENSPUR RENEWABLES LIMITED, London (GB)

(72) Inventor: Hugh-Peter Granville Kelly, Westcliff on Sea (GB)

(73) Assignee: TIME TO ACT LIMITED, Hatfield (GB)

( * ) Notice: Subject to any disclaimer, the term of this patent is extended or adjusted under 35 U.S.C. 154(b) by 0 days.

(21) Appl. No.: 16/309,698

(22) PCT Filed: Jun. 15, 2017

(86) PCT No.: PCT/GB2017/051750
§ 371 (c)(1),
(2) Date: Dec. 13, 2018

(87) PCT Pub. No.: WO2017/216567
PCT Pub. Date: Dec. 21, 2017

(65) Prior Publication Data
US 2019/0140531 A1    May 9, 2019

(30) Foreign Application Priority Data

Jun. 15, 2016  (GB) .................................... 1610414

(51) Int. Cl.
*H02K 21/24*     (2006.01)
*H02K 3/30*      (2006.01)
(Continued)

(52) U.S. Cl.
CPC .............. *H02K 21/24* (2013.01); *H02K 3/02* (2013.01); *H02K 3/04* (2013.01); *H02K 3/30* (2013.01); *H02K 3/34* (2013.01); *H02K 16/02* (2013.01)

(58) Field of Classification Search
CPC .. H02K 3/02; H02K 3/04; H02K 3/30; H02K 3/34; H02K 16/02; H02K 21/24
(Continued)

(56) References Cited

U.S. PATENT DOCUMENTS 3,324,321 A    6/1967 Kober
3,482,131 A    12/1969 Lytle
(Continued)

FOREIGN PATENT DOCUMENTS

DE    2014659 A1    10/1971
EP    2190103 A1    5/2010
(Continued)

OTHER PUBLICATIONS

Licentia et al., English Machine Translation of DE 2014659 (Year: 1971).*
(Continued)

*Primary Examiner* — Tulsidas C Patel
*Assistant Examiner* — Rashad H Johnson
(74) *Attorney, Agent, or Firm* — Quarles & Brady LLP (57) ABSTRACT

An axial flux rotary generator comprising: two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused (Continued)

to rotate relative to the coil annulus; characterised in that the coils comprise a wound flat strip conductor.

11 Claims, 6 Drawing Sheets

(51) Int. Cl.
*H02K 3/02* (2006.01)
*H02K 3/04* (2006.01)
*H02K 3/34* (2006.01)
*H02K 16/02* (2006.01)

(58) Field of Classification Search
USPC ............ 310/156.32, 156.34, 156.35, 156.36, 310/156.37
See application file for complete search history.

(56) References Cited

U.S. PATENT DOCUMENTS

| | | | |
|---|---|---|---|
| 6,046,518 A | 4/2000 | Williams | |
| 6,531,799 B1* | 3/2003 | Miller | H02K 21/046 310/112 |
| 7,402,934 B1* | 7/2008 | Gabrys | H02K 3/345 310/179 |
| 7,492,073 B2* | 2/2009 | Qu | H02K 19/103 310/178 |
| 2007/0069591 A1* | 3/2007 | LeFlem | F03B 13/16 310/12.12 |
| 2008/0231131 A1* | 9/2008 | Gabrys | H02K 21/24 310/114 |
| 2011/0004276 A1* | 1/2011 | Blair | A61B 90/90 607/60 |
| 2011/0084569 A1* | 4/2011 | Asano | H02K 1/148 310/216.058 |
| 2012/0133231 A1* | 5/2012 | Hayakawa | H02K 21/24 310/156.37 |
| 2013/0106317 A1* | 5/2013 | Ludois | H02N 1/00 318/116 |
| 2014/0070638 A1 | 3/2014 | Brennvall | |

FOREIGN PATENT DOCUMENTS

| | | |
|---|---|---|
| GB | 2520516 A | 5/2015 |
| GB | 2525157 A | 10/2015 |
| JP | H02197103 A | 8/1990 |
| JP | 2004312911 A | 11/2004 |
| JP | 2005110353 A | 4/2005 |
| WO | 2010/019951 A1 | 2/2010 |

OTHER PUBLICATIONS

International Search Report and Written Opinion dated Aug. 30, 2017 in connection with PCT/GB2017/051750.
Search Report dated Dec. 12, 2016 in connection with GB1610414.3.

* cited by examiner

AXIAL FLUX GENERATORS HAVING A FLAT STRIP CONDUCTOR WITH PARTICULAR AXIAL WIDTHS FOR LONG TERM RELIABILITY

CROSS-REFERENCE TO RELATED APPLICATIONS

This application represents the national stage entry of PCT International Application No. PCT/GB2017/051750 filed Jun. 15, 2017, which claims priority to Great Britain Patent Application 1610414.3 filed Jun. 15, 2016, the contents of which are hereby incorporated herein by reference for all purposes.

The following invention relates to improvements to the design of coils used within the stators of axial flux generators. In particular, it relates to improvements in the coils of stators used in the type of direct drive permanent magnet generator described in WO 2015/075456 and WO 2016/079537.

A specific application for such a generator is in wind turbines. The construction and method of operation of the generator make possible a slow rotating direct drive configuration. That is to say, the generator rotor can be coupled directly to the turbine's blade rotor, thereby avoiding the need for a gearbox. This is a significant operational advantage, in terms of improving reliability and reducing noise.

It is a long held practice to wind stator coils using conventional insulated circular cross-section copper wire. This is available globally from a variety of sources.

According to the invention, there is provided an axial flux rotary generator comprising: two magnetic annuli; a coil annulus; the magnetic annuli and coil annulus having a common axis; the two magnetic annuli defining a plurality of magnetic fields around the common axis extending across a gap between the two magnetic annuli and the coil annulus having a sequence of coils around the common axis in the gap such that lines of magnetic flux from the magnetic fields cut the turns of the coils and thus induce electric current in the coils as the magnetic annuli are caused to rotate relative to the coil annulus; characterised in that the coils comprise a wound flat strip conductor.

Preferably the width of the flat strip is several times, or more, than its thickness. By this means, a winding spiral is possible in which each layer rests exactly upon the preceding layer and thus the entire volumetric space for the stator coil is occupied by an electrical conductor. For specific types of conductor, a packing factor of virtually 100% is attainable, thus notably maximising electrical output. By contrast, specific winding difficulties pertaining to the winding of stator coils with conventional circular cross-section wire, can limit the true effective packing factor to as low as 78%.

A major secondary advantage of utilising strip conductor relates to ease of winding, especially for very substantial coils of diameters exceeding 0.5 m and especially so if the profiling of the coil (i.e. the cross-sectional shape of the coil) is elliptical as opposed to circular.

The primary choice of conductor for any motor or generator winding is copper, having the highest conductivity of any metal commonly available. And indeed, this is available in strip form and can be used for winding the stator coils of the present invention. Measures effective to insulate the copper strip include varnishing or using bare copper and then the interleaving of a plastics insulating strip as winding progresses.

An attractive alternative however, is the use of aluminium. Although not enjoying the same conductivity as copper, it has specific advantages over copper. The first being the fact that it is anodisable to effect insulation, that is the chemical changing at microscopic level of its surface to provide an insulating layer. Typically the thickness of such insulation is the order of a few microns, wholly insignificant in terms of influence on resistivity on a strip of thickness of say half of a millimeter (500 microns). Thus, according to an aspect of the invention, the stator coils are formed from aluminium strip, anodised on one, or both sides. This is in important contrast to copper, where the use of insulating varnish, or an interleaved plastic strip does have a material impact on effective resistance per unit area.

Additional advantages that pertain to the use of aluminium as a conductor relate to density and cost. Aluminium is approximately half the density of copper, and by weight, half its cost (at 2016 prices). Thus a coil formed from aluminium strip can cost potentially one quarter of the equivalent copper coil. The provision of extra stator coils, specifically 20% more in number, to compensate for reduced electrical output due to the higher resistivity of aluminium relative to copper is dwarfed by the overall materials cost and weight savings.

One other factor relates to heat density. Coils formed from aluminium strip can operate and survive at far higher temperatures than copper. This de-sensitises cooling issues, and affords greater long term reliability.

In terms of the designed axial widths of stators and rotors for axial flux generators, conventional electromagnetic design teaches that optimum output is attained—for a given workable range—when the axial width of the rotor magnets is equal to the axial width of stator coils sandwiched between them. Finite Element Analysis applied to optimise the electromagnetic configuration of the generator of WO 2016/079537, shows this is not the case. It is a feature of this generator that its design makes practical the use of inexpensive and abundantly available ferrite permanent magnets. In this case, optimal performance, both in terms of electrical output and material cost, is surprisingly found to be achieved when the magnet width is selected to approach double the width of the stator coil. A specific optimum is achieved when the magnet is of width 75 mm and the coil, 40 mm. In such a case, the winding packing factor when using conventional circular cross-section wire in the winding of the coil is considerably worsened. In addition, when very substantial coils are to be constructed as would be the case for ferrite-based generators supplying power in the order of megawatts, it is extremely difficult to avoid "wild winding" from occurring, in which maintaining perfectly layered layers becomes impossible. Thus, according to as an aspect of the invention, strip conductors are used for stator coils having especially narrow axial widths from 60 mm down to 40 mm or less.

The invention will now be described referred to the accompany drawings in which:

FIG. 4 *a* to *c* shows factors influencing packing factors.

FIG. 4 *d* shows a conventional narrow width coil.

In order to facilitate an understanding of the present invention, a general description of my original first generator, as disclosed in WO 2015/075456, is first given.

Figure 1:
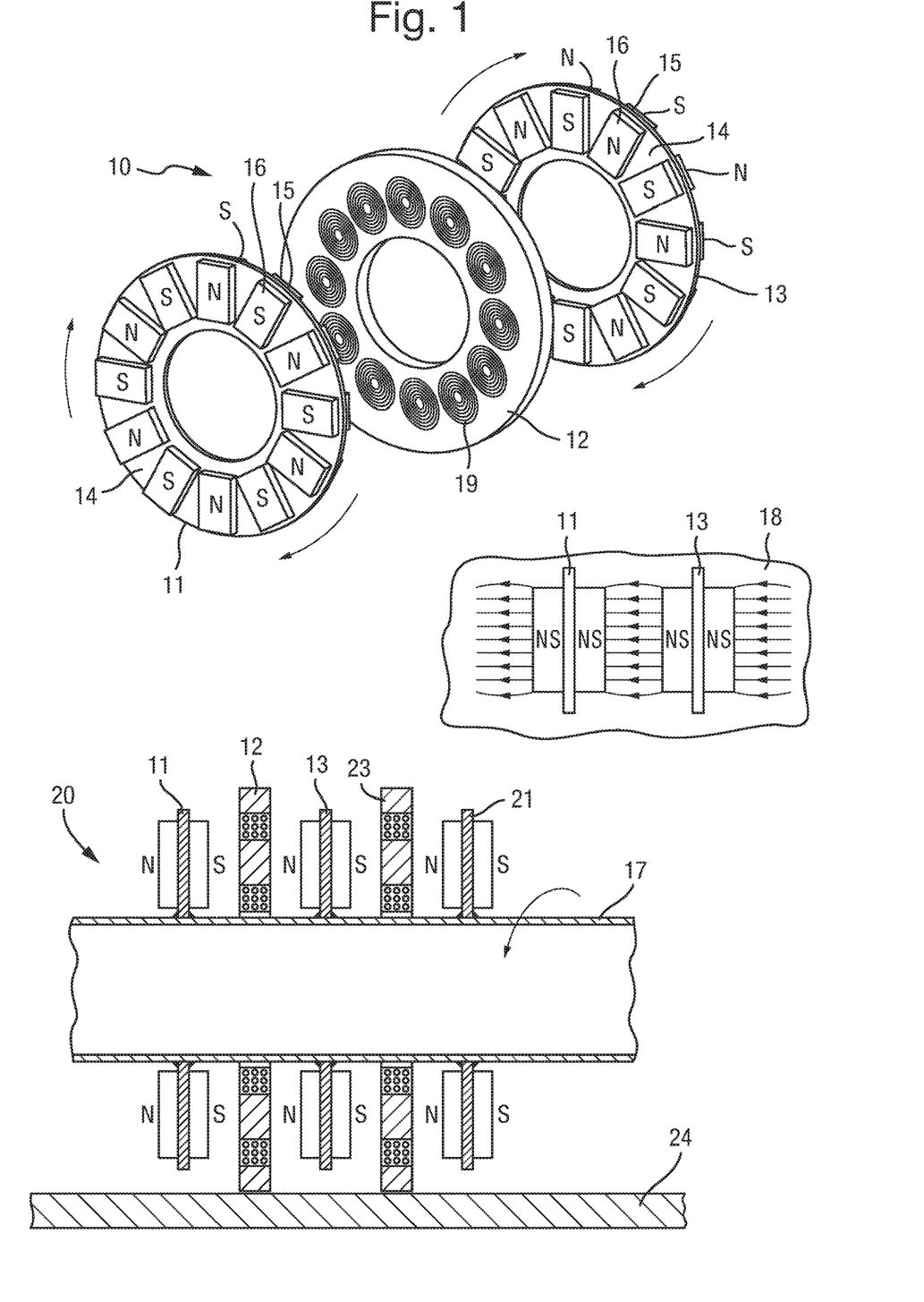
FIG. 1 shows an exploded view of a generator of the present invention.

Referring to FIG. 1, the principal components of this first generator 10 are shown in exploded view at 11, 12 and 13 which are stator and armature annuli coaxially mounted for relative rotation around their common axis. 11 and 13 are rotating rotors or armature annuli or magnetic annuli. Although the generator 10 is described as having two (or more) magnetic annuli 11, 13, a generator 10 as described herein will function with only one magnetic annulus.

Each magnetic annuli 11, 13 comprises a ferromagnetic annulus 14 onto and around each side of which are affixed in attraction permanent magnets 15 and 16 to form a magnetic annulus defining a plurality of magnetic fields around the axis of the rotating rotors 11, 13. In an embodiment, the outward facing polarities of the magnets alternate from north to south around the annulus as shown such that the magnetic fields are of alternating polarity. This allows adjacent magnetic fields to be closely spaced, thereby optimising induced emf for a given generator diameter. The rotors 11 and 13 are each located on a central cylinder 17, but are one magnet pole pitch displaced from their facing neighbours, such that all of the magnets on the rotors are in attraction, and lines of magnetic flux can cross freely all the way across the gap from one rotor disc to the next. This is further illustrated by the inset diagram shown at 18. In an embodiment, the magnetic annuli 11, 13 are magnetically uncoupled from each other (apart from the magnets). This means that there is no magnetic material connecting the magnetic annuli 11, 13 together. The flux crossing the gap, and thus cutting the stator coils, is entirely between facing magnets. This helps concentrate flux across the gap. In other words, no physical magnetic coupling between the magnetic annuli 11, 13 is required in order to generate significant amounts of emf. In an embodiment, each of the stator/armature annuli is self contained, in as much that no or substantially no physical magnetic coupling and/or actual magnetic contact is required between them for efficient operation of the generator.

The coil carrying stator annuli or coil annuli 12 are sandwiched between the rotating rotors 11, 13, and are maintained stationary relative to the rotating rotors 11, 13. Each stator annuli 12 carries a series of contiguous, or nearly contiguous, coils 19 in the gap. By contiguous or nearly contiguous is meant a lateral gap between adjacent sides of coils being no more that 10% of their circumferential lateral width. In an embodiment, the coils 19 are sited around the stator annulus 12 circumference. The coils 19 may be circularly attached around the common axis as illustrated. The stator annuli 12 are affixed to mounting means (not shown) to maintain them equally spaced in between the armature annuli 11, 13. A generator of modest rating could comprise just two armature annuli 11, 13 sandwiching a single stator annulus 12, or even just one armature annulus 11 and one stator annulus 12, but the arrangement can be repeated for the requisite generator capacity along the full length of the generator, as shown at 20, where 11 and 13 and 21 are rotating magnetic rotors and 12 and 23 are the stator coil annuli. The stator coil annuli 12 and 23 are in this case shown mounted on a portion of an external supporting structure 24. In the particular arrangement shown, the circumferential pitch of the magnets is the same as that of the coils (which is not in accordance with the present invention).

Although the magnets are shown on the rotating annuli 11, 13 and 21 in fact they could alternatively be mounted on the stator annuli 12 and 23 and the coils 19 be mounted on the rotating (armature) annuli 11, 13 and 21. In this case, suitable commutation means would be required to conduct the generated emf away from the rotors.

The sequence of coils is circularly attached around the common axis such that lines of magnetic flux from the magnetic fields cut the turns of coils 19 and thus induce electric current in the coils 19 as the armature annulus is caused to rotate relative to the stator annulus. In the case of three magnetic annuli 11, 13 and 21, the coils are in the gap between the three magnetic annuli 11, 13 and 21.

Figure 2:
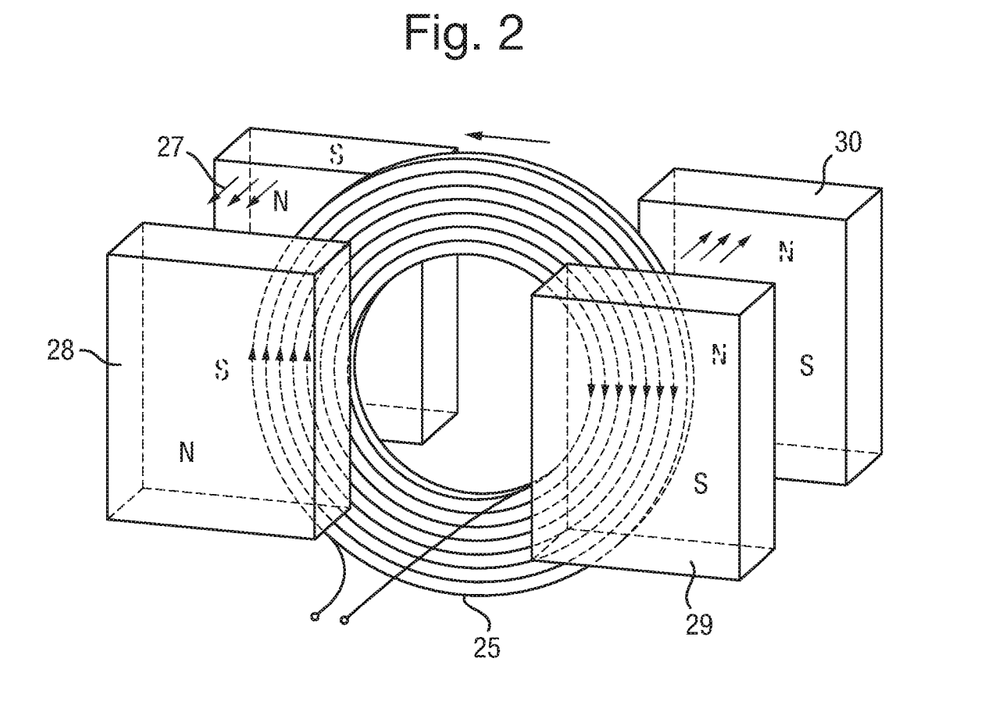
FIG. 2 shows in detail a section of the stator and stator of the generator.

The principle of operation is now explained with reference to FIG. 2. A single coil 25 is shown passing through the gap defined in between the facing permanent magnets 27 and 28, 29 and 30. (This is a representation of a single coil from a stator annulus sandwiched between two pairs of rotor magnets. Note, for convenience of illustration the coil is shown moving through the magnetic fields, as opposed to the actual case where the magnet carrying rotors rotate relative to the stationary stators).

Figure 3:
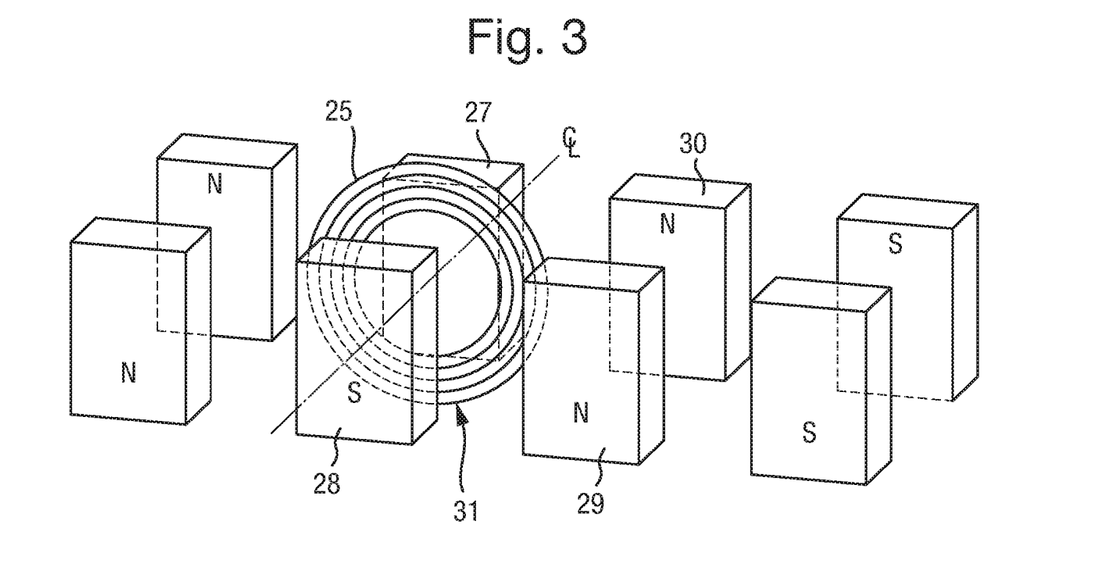
FIG. 3 is a further view of the magnet and coil arrangement.

An electromagnetic force is induced in the coil as follows. The left hand portion of the coil 25 cuts the lines of force crossing from the north face of magnet 27 to the south face of magnet 28. An "upwards" (clockwise) emf is induced in the left hand side of the coil. The right hand side of the coil similarly cuts lines of force, but which pass this time from the north pole of 29 to the south pole of 30. On account of this reversal of flux direction, a "downwards" (also clockwise) emf is induced. Thus the two emfs, both acting in the clockwise sense, add to generate a flowing current in the coil. From the foregoing, it will be seen from examination of FIG. 1, in which the pitch of the coils is the same as that of the magnets, that all of the coils generate simultaneously and in phase as they cut across the magnetic fields passing between the faces of the magnets sandwiching them. The emf generated alternates from plus to minus as the coils are crossed by fields alternating in direction around the rotor. The zero generation point occurs as the coil straddles symmetrically the center of any one set of facing magnets, as shown at 31 in FIG. 3.

Preferably the spacing between individual magnetic fields, the spacing between the centers of individual coils and the geometry of the individual coils is such that turns of one side of the coils are in a first magnetic field of the plurality of magnetic fields at the same time as turns of the other side of the coils are in a magnetic field of opposite polarity of the plurality of magnetic fields adjacent to the first magnetic field. This ensures that the diameter of the coil is not such that its respective side portions, in the direction of travel, could overlap to any significant extent, lines of force of the same polarity. If that does occur, the emf generated on one side of the coil would counter that being generated on its other side and a reduction in efficiency would result. So the generation of emf is optimised for as much of the travelled distance possible as any one coil passes through the fields provided by the magnetic fields.

For this arrangement to be economically viable—in terms of the electricity generated—the output of the generator is preferably maximised to the fullest extent possible. Even a few percent counts, as this translates directly to the power provided by the turbine over its lifetime, and therefore the commercial returns from it, or the wind farm in which it and others are located.

Electrically, this maximisation is determined by three factors. These are a) the magnetic flux provided by the rotors, b) the area of coil conductor cut by the said flux, and c) the rate of rotation. The invention disclosed herein relates to the second factor, and a method of improving this.

For axial flux generators, and in particular that described above, attaining a high coil packing factor (and hence electrical output) is not possible with circular cross section copper wire. (This will be hereinafter explained in more detail). Due to specific and non-obvious winding difficulties, including interstitial spacings between turns and insulation thickness, it is simply not possible to utilize the volumetric space efficiently in terms of output especially for large generators having significant outputs, e.g. >0.5 MW, when using normal winding wire.

Figure 4A:
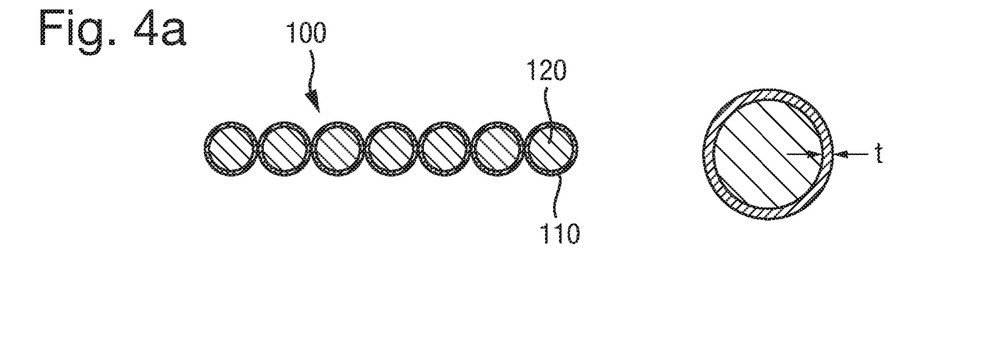
Figure 4B:
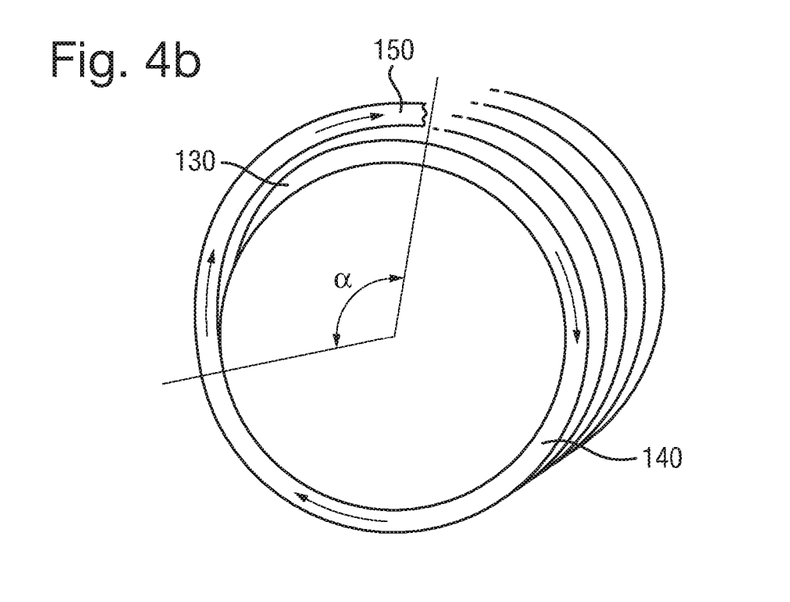
Figure 4C:
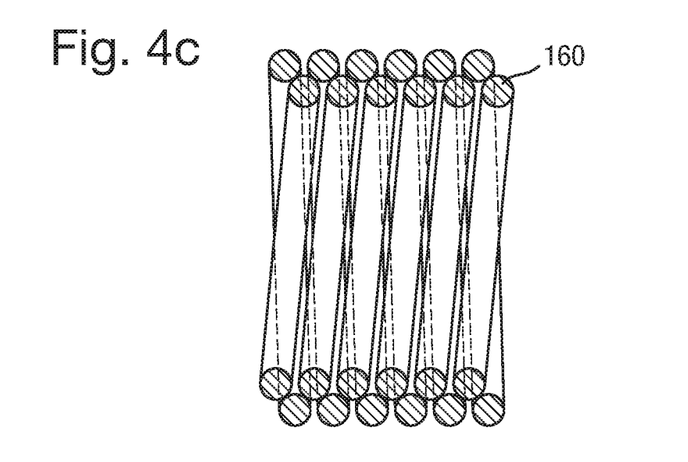

The factors influencing achievable packing factors for coils wound with conventional circular cross section wire are described with reference to FIG. 4, a to c.

The first and most apparent factor, simply relates to the copper area lost as a result of the thickness of insulation necessarily deposited upon it. This is shown at FIG. 4a, where a row of coil turns is shown turns at 100, comprising copper conductors 120 and the insulation covers 110 deposited upon them. The thickness of the said insulation is shown at larger scale at t. For Class A insulated wires, this can be a significant proportion of the overall diameter. For example, for normal commercial grade 2 winding wires, it may occupy 11% of the overall surface area. As a first step, the conductor area is thus reduced to 89% of the theoretical maximum.

Referring to FIG. 4b, a further significant factor is illustrated. When winding any layered coil, it is naturally necessary once the winding slot in question becomes full, for the wire to have to skip up to the next layer and so on. This wastes appreciable space, as shown at 130 when the winding wire is shown leaving the inner layers 140 to mount upon them to form the next layer 150. An angle showing the proportion of wasted space is shown at a. This process occurs of course both at the start of the layer and at its end. When the diameter of the winding wire is significant relative to the slot width, for example 2 mm & 40 mm respectively, as much as whole turn can be lost per layer. A further reduction results, in this example to 95% of the theoretical maximum. The effect is thus especially pertinent in the case of relatively narrow axial width coils, as are used in the stators of the generator described above.

Figure 4D:
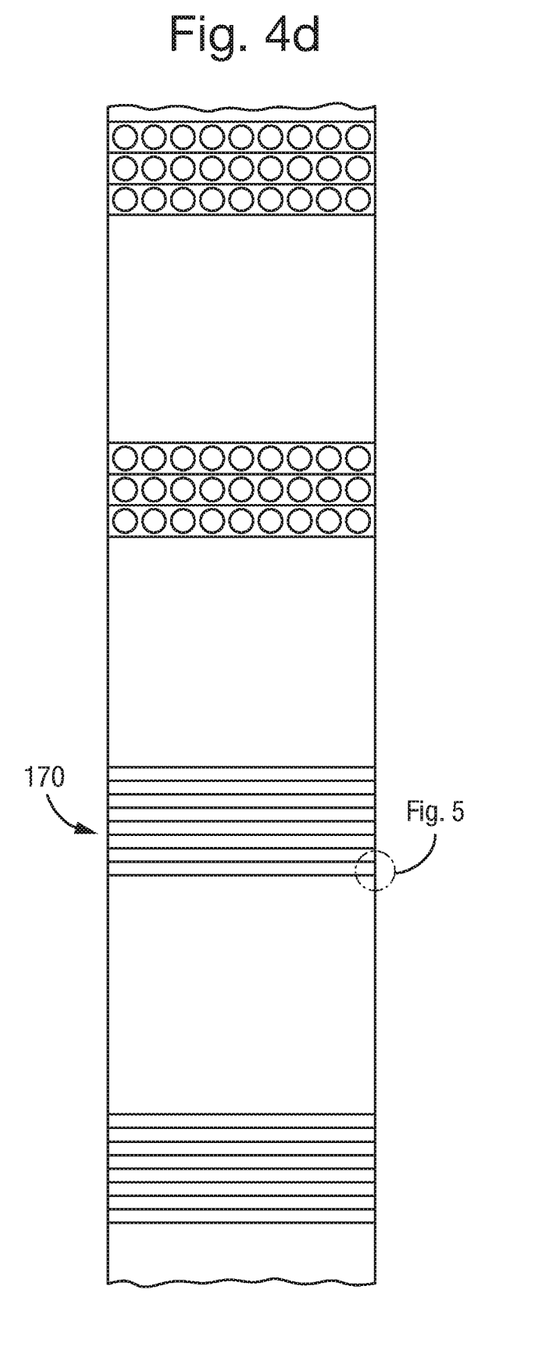

The final significant effect relates to the manner in which the layers of wire rest one upon the other. One turn of wire does not rest obligingly within the groove between two turns of the lower layer. Instead, because the layer helices cross at an angle, as shown at 160 in FIG. 4c, significant interstitial packing losses result between the turns of the crossing layers. Other effects also come into play. Combining all of these effects can reduce the true packing factor to as low as 78% for a coil of the form shown in FIG. 4d.

In the present invention, the coils comprise wound flat strip conductor or strip wire. Flat strip conductor is a conductor which in cross-section across the longitudinal elongate direction is substantially rectangular in shape (as opposed to circular in shape as in conventional circular cross-section copper wire). The aspect ratio of the rectangular shape is such that the width of the flat strip conductor is several times, or more, than its thickness. For example the width is at least 10, preferably 100 times the thickness (including any anodising layer, described below).

The flat strip conductor is wound up on itself such that flat sides (the sides made up of the longer sided of the rectangular cross-section extending along the longitudinal elongate direction) of individual adjacent windings of the coil face each other (the inner flat side of one coil faces the outer flat side of the adjacent inner coil). For certain types of conducting material, a layer of electrically insulating material is positioned between adjacent flat sides. As described below the flat strip conductor may be insulated by a layer of electrically insulating material on one or both flat sides.

Figure 5:
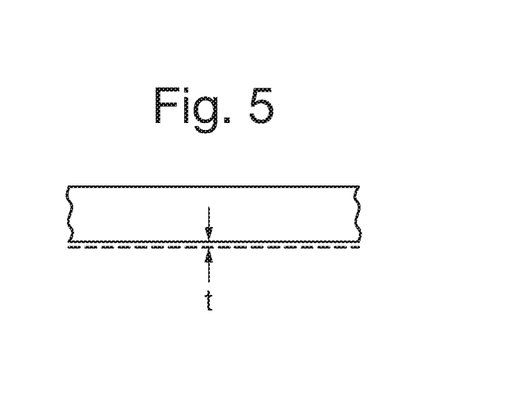
FIG. 5 shows a winding formed from a strip conductor

The advantages of using in comparison strip wire are shown with reference to FIG. 5. A continuous spiral 170 results with no packing losses whatsoever, other than those arising from the insulation thicknesses. An immediate gain is achieved. In the case of winding a coil with copper strip, the optimum material in terms of resistance, packing factors exceeding 90% are possible. 100% cannot be reached owing to insulation thickness provided, either by varnishing the strip (to provide a layer of electrically insulating material) or winding alongside the copper strip an intermediate plastics insulating film such as Mylar.

However, if aluminium strip is used, the thickness of the insulation can be reduced to virtually nothing. This is achieved by anodising the aluminium, even on one side only, so providing the electrically insulating layer from as little as 1 micron thick up to 5 microns. This is insignificant for a strip of thickness 0.5 mm, being 1-5 parts in 500. In this case a packing factor approaching unity is possible.

Although the resistivity of aluminium is less favourable than copper (approximately 64%), it can be seen that this is not a significant margin lower than the packing factor of 78% applying to conventional round cross section wire coils.

Aluminium enjoys significant other advantages over copper in terms of weight and cost. It can tolerate far higher operating temperatures than insulated copper wire, e.g. >600° C. as opposed to 200° C.

A renowned supplier of aluminium foil is the company STEINERT Elektromagnetbau GmbH who manufacture the aluminium strip foil, Anofol, in a wide variety of widths and thicknesses.

Figure 6:
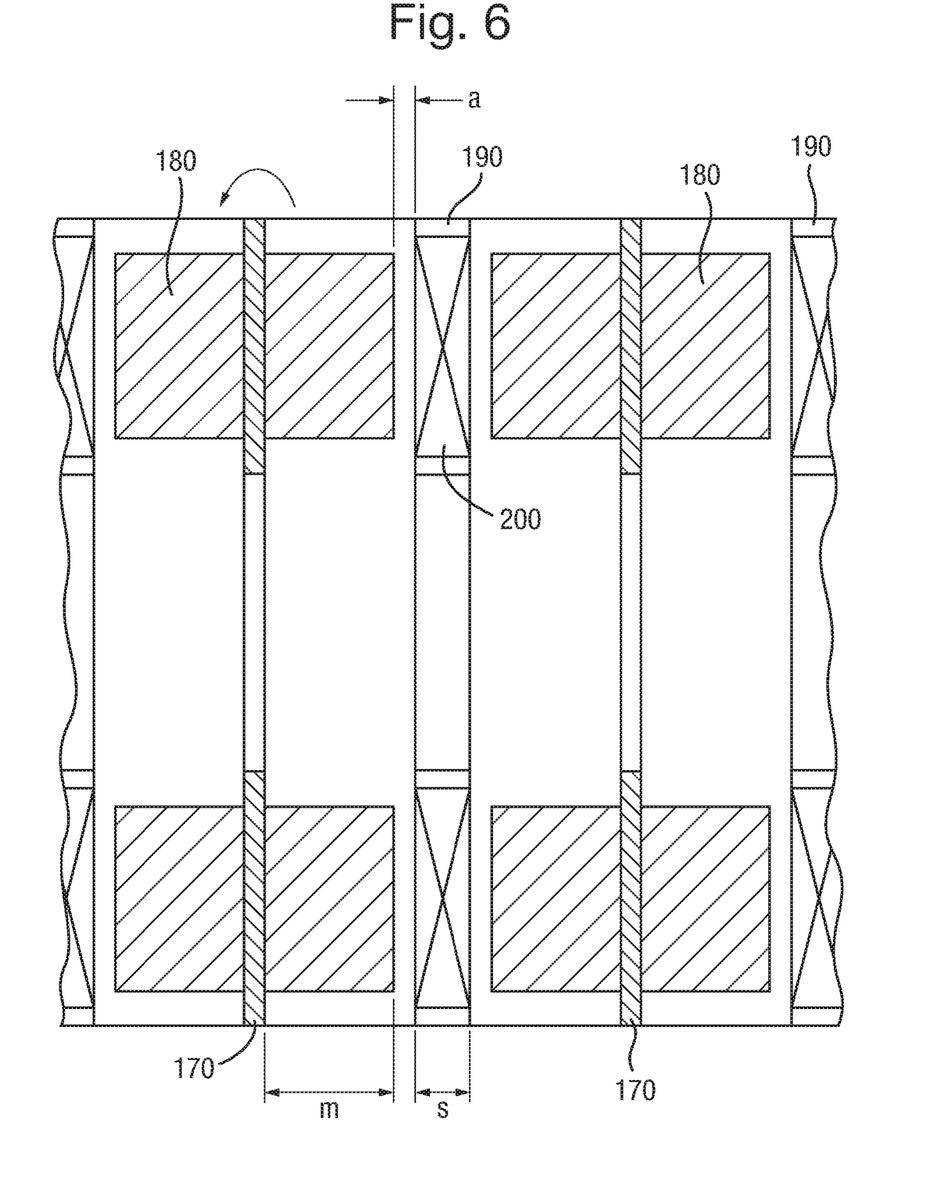
FIG. 6 shows a portion of axial flux generator using the stator coils of the invention and FIG. 7 shows substantial coils used with the stator of a large generator.

Reference is now made to FIG. 6, in which a section of a type of generator is shown in which use can be advantageously made of the coils of the invention. Rotors 170 carrying permanent magnets 180 are shown sandwiching stators 190. For reasons of both material cost and electromagnetic performance, the magnet axial width m considerably exceeds the coil 200 axial width s, as shown. In an embodiment, the magnet axial width is at least two times the coil axial width s. The narrower (thinner) the coils, the greater the advantage of the present invention. Preferably the coils have an axial width of 60 mm or less, preferably 50 mm or less and most preferably 40 mm or less. It can be appreciated that maximising the winding's packing factor is especially important in this case, for which selection of strip conductors is ideal, in accordance with the present invention. As can be seen, the axial width of the coils 200 (and so the axial width of the flat strip conductor) is substantially the same as the axial width of the stator (coil annulus) 190. Preferably the axial width of the coils at a maximum only 1% or less wider than the stator and at a minimum only 5% or less narrower. More preferably the width of the coils is no wider (i.e. +0%) than the stator and a minimum only 2% or less narrower than the axial width of the stator. This achieves the most amount of conductor possible in the gap between the magnets and so highest generated power.

A final consideration relates to the ease of winding. In such a form of generator, very substantial radial length permanent magnets may be employed upon the rotors, cutting the turns of equivalent sized sandwiched stator coils, to provide the desired output. An example would be the case of a 1 MW generator having a rotor of diameter 7 m carrying magnets with a radial length of 1.5 m.

Figure 7:
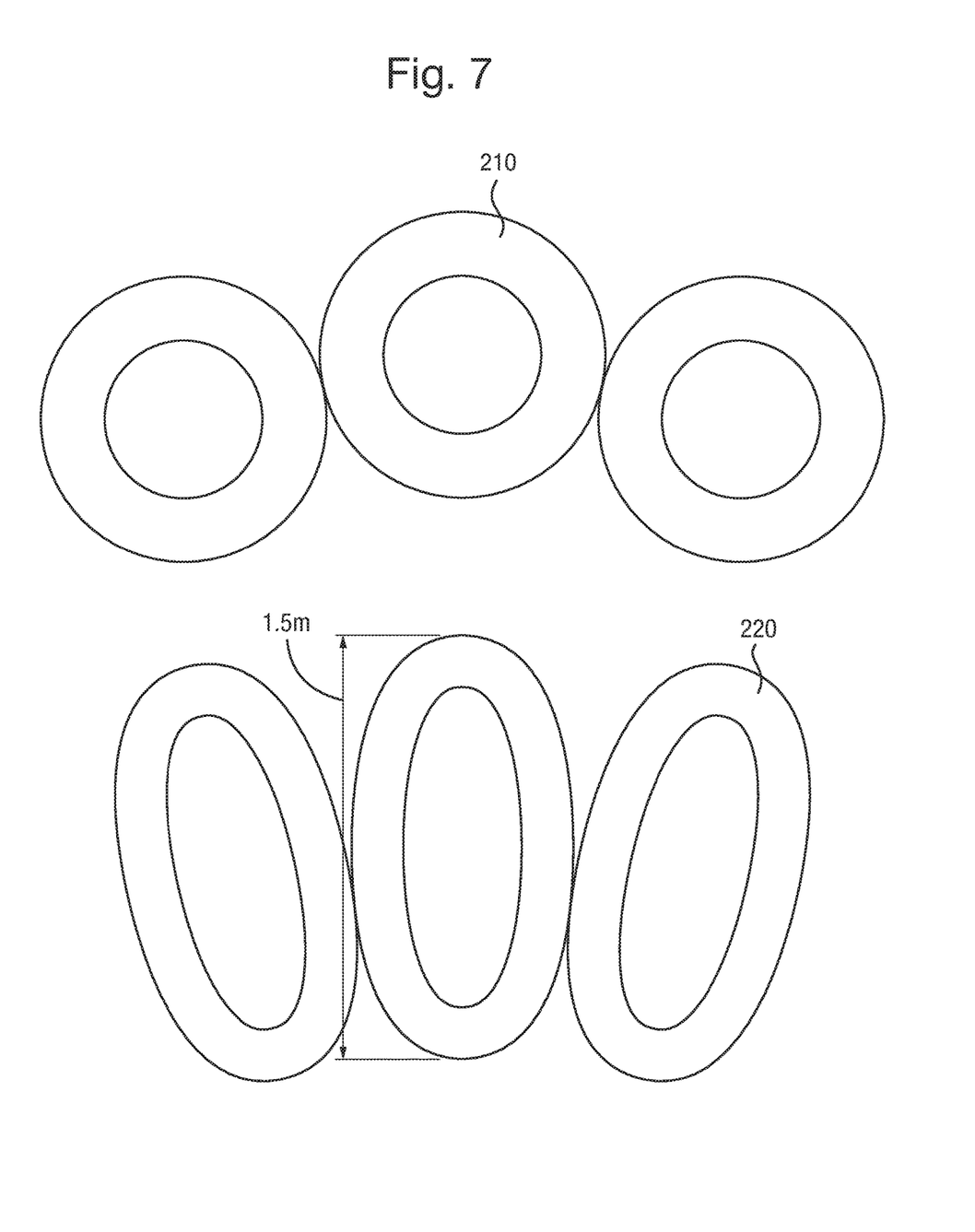

Equivalent sized coils (e.g. 1.5 m in diameter) are thus required, such as are shown in FIG. 7 at 210 and 220. Winding substantial coils having e.g. an outer diameter of 1.5 m & an inner diameter of 0.5 m presents formidable problems when using round cross section wire, due to its tendency to fall into "wild" winding patterns, so ruining reasonable packing factors. Strip conductor can form substantial spiral windings without these associated problems.

An additional advantage is the ease with which non-circular cross-section coils can be wound using flat strip conductor. This allows for instance elliptical coils to be used, such as that shown in FIG. 7 at 220, which have generating advantages compared to circular coils. This is because a greater length of conductor of such coils travels through the magnetic field in a direction close to perpendicular to the longitudinal direction of the conductor. Elliptical coils can be difficult to wind up using circular cross-section wire, but are easily wound up using flat strip conductor.

Numerous variations will be apparent to those skilled in the art.

The invention claimed is:

1. An axial flux rotary generator comprising:
   two magnetic annuli;
   a coil annulus;
   the magnetic annuli and coil annulus having a common axis;
   the two magnetic annuli defining a plurality of magnetic fields around the common axis extending across a gap between the two magnetic annuli and the coil annulus having a sequence of coils each coil being wound spirally in a layer, the sequence of coils being around the common axis in the gap such that lines of magnetic flux from the magnetic fields cut the turns of the coils and thus induce electric current in the coils as the magnetic annuli are caused to rotate relative to the coil annulus;
   wherein the coils comprise a wound flat strip conductor;
   wherein the flat strip conductor has an axial width of within +1% and −5% of the axial width of the coil annulus and the axial width of the coils is within +1% and −5% of the axial width of the coil annulus.

2. The axial flux generator of claim 1, wherein the flat strip conductor has an axial width of between +0% and −2% of the axial width of the coil annulus.

3. The axial flux generator of claim 1, wherein the flat strip conductor is insulated by a layer of electrically insulating material on one or both flat sides.

4. The axial flux generator of claim 3, wherein the one or both flat sides are anodised to provide the layer of electrically insulating material.

5. The axial flux generator of claim 3, wherein a thickness of the layer of electrically insulating material is 1-5 µm.

6. The axial flux generator of claim 1, in which the width of the flat strip conductor is several times, or more, than a thickness of the flat strip conductor.

7. The axial flux generator of claim 1, in which the material of the flat strip conductor used to form the coil is aluminium.

8. The axial flux generator of claim 1, in which the flat strip conductors used for the coils have an axial width of 60 mm or less.

9. The axial flux generator of claim 1, wherein magnets of the magnetic annuli are ferrite permanent magnets.

10. The axial flux generator of claim 1, wherein an axial width of permanent magnets of the magnetic annuli is at least twice the axial width of a coil of the coil annulus.

11. The axial flux generator of claim 1, wherein the coils have an elliptical cross-section.

* * * * *